(12) United States Patent (10) Patent No.: US 12,420,745 B2
Ricke (45) Date of Patent: Sep. 23, 2025

(54) MULTI-CHANNEL CLEANING APPARATUS, MULTI-CHANNEL SENSOR-CLEANING MODULE, AND VEHICLE

(71) Applicant: ZF CV Systems Global GmbH, Bern (CH)

(72) Inventor: Janik Ricke, Uetze (DE)

(73) Assignee: ZF CV Systems Global GmbH, Bern (CH)

( * ) Notice: Subject to any disclaimer, the term of this patent is extended or adjusted under 35 U.S.C. 154(b) by 429 days.

(21) Appl. No.: 18/150,641

(22) Filed: Jan. 5, 2023

(65) Prior Publication Data

US 2023/0150455 A1 May 18, 2023

Related U.S. Application Data

(63) Continuation of application No. PCT/EP2021/068927, filed on Jul. 8, 2021.

(30) Foreign Application Priority Data

Jul. 23, 2020 (DE) ...................... 10 2020 119 476.5

(51) Int. Cl.
*B60S 1/52* (2006.01)
*B60S 1/48* (2006.01)
*B60S 1/54* (2006.01)

(52) U.S. Cl.
CPC ................ *B60S 1/52* (2013.01); *B60S 1/481* (2013.01); *B60S 1/54* (2013.01)

(58) Field of Classification Search
CPC .... B60S 1/52; B60S 1/481; B60S 1/54; B60S 1/56; B08B 3/02; B08B 5/02
See application file for complete search history.

(56) References Cited

U.S. PATENT DOCUMENTS

| 2015/0343999 A1* | 12/2015 | Lopez Galera | B60S 1/0848 |
| | | | 134/30 |
| 2018/0015907 A1* | 1/2018 | Rice | B60S 1/52 |
| 2020/0001832 A1* | 1/2020 | Deane | B08B 3/02 |
| 2020/0139940 A1* | 5/2020 | Rice | B60S 1/52 |

(Continued)

FOREIGN PATENT DOCUMENTS

| DE | 10 2018 126 090 A1 | 4/2020 |
| DE | 11 2018 004 504 T5 | 6/2020 |
| EP | 3 168 094 A1 | 5/2017 |

OTHER PUBLICATIONS

International Search Report of the European Patent Office dated Oct. 18, 2021 for international application PCT/EP2021/068927 on which this application is based.

(Continued)

*Primary Examiner* — Qingzhang Zhou
(74) *Attorney, Agent, or Firm* — Walter Ottesen, P.A.

(57) ABSTRACT

A multi-channel cleaning apparatus is disclosed for a vehicle to provide a liquid cleaning pulse and/or a compressed-air cleaning pulse for at least two cleaning nozzles. The multi-channel cleaning apparatus includes a module compressed-air port for admitting compressed air and a module liquid port for admitting cleaning liquid. At least two nozzle branches are provided wherein one nozzle branch is configured for supplying at least one cleaning nozzle independently of another nozzle branch.

19 Claims, 5 Drawing Sheets

(56) References Cited

U.S. PATENT DOCUMENTS

2021/0197769 A1    7/2021   Shirakura et al.
2021/0387596 A1   12/2021   Fiebrandt et al.

OTHER PUBLICATIONS

English translation and Written Opinion of the International Searching Authority dated Oct. 18, 2021 for international application PCT/EP2021/068927 on which this application is based.

\* cited by examiner

MULTI-CHANNEL CLEANING APPARATUS, MULTI-CHANNEL SENSOR-CLEANING MODULE, AND VEHICLE

CROSS-REFERENCE TO RELATED APPLICATIONS

This application is a continuation application of international patent application PCT/EP2021/068927, filed Jul. 8, 2021, designating the United States and claiming priority from German application 10 2020 119 476.5, filed Jul. 23, 2020, and the entire content of both applications is incorporated herein by reference.

TECHNICAL FIELD

The disclosure relates to a multi-channel cleaning apparatus for providing a liquid cleaning pulse and/or a compressed-air cleaning pulse. The disclosure furthermore relates to a sensor cleaning module, to a vehicle, and to a method for operating a cleaning apparatus.

BACKGROUND

Cleaning apparatuses for vehicles, in particular for providing a liquid cleaning pulse and a compressed-air cleaning pulse, are generally known.

For example, EP 3 168 094 B1 describes a system for cleaning an external sensor surface installed on the vehicle, including an air nozzle that is configured to emit air onto a sensor surface; an air pump that has a fluid inlet, an air outlet, an air-fluid interface, and a variable volume compression chamber that communicates with the air outlet; with an air flow control device that communicates with the air nozzle and with the air outlet in order to control the air flow through same; and a liquid pump that communicates with the fluid inlet in order to deliver a flow of pressurized liquid, such that the volume of the compression chamber changes, in order to generate a volume of compressed air with an absolute pressure of lower than 10 bar.

Such approaches are however in need of improvement, in particular as regards the provision of a supply to multiple cleaning nozzles, in particular for cleaning multiple sensor surfaces.

Cleaning apparatuses are also in need of improvement with regard to the individual controllability of the cleaning pulses, and in particular an application of compressed air to a sensor surface independently of a liquid cleaning pulse.

It is therefore desirable to improve the function and the construction of the cleaning apparatus, in particular to make it possible for a supply to be provided to multiple cleaning nozzles with relatively little expenditure on equipment, and to allow improved controllability, in particular controllability of cleaning pulses and/or compressed-air flows.

SUMMARY

The disclosure addresses this, and it is an object of the disclosure to specify an improved cleaning apparatus, in the case of which, in particular, the provision of a supply to multiple cleaning nozzles, and/or the possibility of controlling individual cleaning pulses, is improved.

The object relating to the cleaning apparatus is achieved by the disclosure, in a first aspect, by a multi-channel cleaning apparatus.

The disclosure proceeds from a multi-channel cleaning apparatus for a vehicle for providing a liquid cleaning pulse and/or a compressed-air cleaning pulse, for at least two cleaning nozzles, including:

a module compressed-air port for admitting compressed air, and a module liquid port for admitting cleaning liquid.

According to an embodiment of the disclosure, in the multi-channel cleaning apparatus, at least two nozzle branches are provided, wherein a nozzle branch is configured to provide a supply to at least one cleaning nozzle independently of another nozzle branch, wherein each nozzle branch includes:

a pressure cylinder with a cylinder volume, including a movable separating means that divides the cylinder volume in fluid-tight fashion into an air chamber, which accommodates compressed air, and a liquid chamber, which accommodates cleaning liquid, wherein the air chamber has an air chamber port to which compressed air can be applied for the purposes of filling the air chamber, wherein, in the event of filling of the air chamber, movement of the separating means counter to a restoring force and enlargement of the air chamber result in a reduction in size of the liquid chamber, whereby cleaning liquid is provided in the form of the liquid cleaning pulse at a liquid nozzle line via a liquid chamber port of the liquid chamber, and a switching valve that is configured to produce a pneumatic connection between the module compressed-air port and the air chamber port in an air admission position, and a bypass valve that is configured to produce a pneumatic connection between the module pressure port and the compressed-air nozzle line, bypassing the switching valve, in an open position in order to provide a bypass compressed-air flow.

The disclosure is based on the consideration that a supply of cleaning media, in particular cleaning liquid and compressed air, to multiple cleaning nozzles is generally advantageous in order to reliably clean a number of sensors that is constantly increasing with the progression of technological development. Here, as central a supply as possible, in particular in a multi-channel cleaning apparatus, is particularly advantageous because—by contrast to a multiplicity of individual cleaning apparatuses—the installation effort, weight, installation space and costs can be advantageously reduced. However, individual controllability of individual cleaning nozzles or individual groups of cleaning nozzles should advantageously be possible here. Via a central multi-channel cleaning apparatus with an in particular small number of defined ports and interfaces, in particular one module compressed-air port, one module liquid port, one module control connection and a number of liquid nozzle ports and compressed-air nozzle ports, an integration of the multi-channel cleaning apparatus can be advantageously simplified and improved.

In accordance with the cleaning nozzles to which a supply is to be provided in a mutually independent manner, a corresponding number of nozzle branches may be implemented in the multi-channel cleaning apparatus. Through the use of pressure cylinders for generating both the compressed-air cleaning pulse and the liquid cleaning pulse, it is advantageously possible for both cleaning media, that is, compressed air and cleaning liquid, to be provided in pressurized form, that is, in the form of cleaning pulses, to a cleaning nozzle via only one pressure source, in particular a compressor or a pressure accumulator. It is thus advantageously possible to omit a further pressure source, in particular a liquid pump, whereby the expenditure on equipment is advantageously reduced further.

The provision of a bypass valve in a nozzle branch advantageously makes it possible here to generate a bypass compressed-air flow independently of the pressure cylinder, whereby a compressed-air flow for cleaning a sensor surface can be provided. This makes effective cleaning of the sensor surface possible in an advantageously liquid-saving manner, in particular in rainy conditions or in the case of dry cleaning for the purposes of blowing the sensor surface clear of particles.

The cleaning liquid may in particular be water or a mixture of water with cleaning agent and/or antifreeze.

In particular, the switching valve is configured to produce a pneumatic connection between the air chamber port and a compressed-air nozzle line, for the purposes of providing the compressed-air cleaning pulse by return movement of the separating means under the action of the restoring force, in a venting position.

In a preferred embodiment, provision is made for the separating means to be a cylinder plunger which is movable axially along a cylinder axis of the pressure cylinder and which bears sealingly against a cylinder inner wall of the pressure cylinder, wherein the cylinder plunger is of cylindrical form and has a plunger height and is held in the pressure cylinder via a restoring spring, which has a spring constant, for generating the restoring force.

Through the selection or the setting of a spring constant of the restoring spring of a pressure cylinder, it is possible to influence the restoring force and thus advantageously a pulse pressure with which, in particular, a compressed-air cleaning pulse of the pressure cylinder is provided. Here, the pulse pressure is determined from a plunger area of the cylinder plunger multiplied by the restoring force. Here, the spring constant of the restoring spring should be selected so as to yield a pulse pressure that is lower than an application pressure applied to the pressure cylinder at the air chamber port, in order that the restoring spring can be compressed. The spring constant should preferably be selected such that an application force—which is determined from the application pressure applied to the air chamber port of the pressure cylinder multiplied by the plunger area of the cylinder plunger—is sufficient to move the cylinder plunger counter to the force of the restoring spring. The application force is thus preferably higher than the restoring force of the spring. Correspondingly, in this case, the pressure of the resulting compressed-air cleaning pulse is lower than the application pressure. The higher the application pressure, and correspondingly the application force, the higher the pressure of the resulting liquid cleaning pulse. The spring constant may advantageously be selected in a manner dependent on the application pressure, for example such that the application force is twice the restoring force.

In an embodiment, provision is made for several, in particular all, pressure cylinders of the multi-channel cleaning apparatus to be arranged in one pressure cylinder block, in particular as structurally identical pressure cylinder modules. In particular, the pressure cylinder modules are, in each case at their module side, arranged adjacent to one another, in particular screwed together, to form a pressure cylinder block. In preferred embodiments, a pressure cylinder block with a number of pressure cylinder modules may also be milled from one piece, printed, or cast. Other suitable manufacturing methods are in particular primary forming, deforming, cutting, joining, additive or similar manufacturing methods. In the case of detachable assembly, in particular by screw connection, it is advantageously possible for the number of pressure cylinder modules to be individually adapted to a specific usage situation.

In an embodiment, provision is made for a cylinder plunger of the pressure cylinder of one nozzle branch to have a plunger height that differs from a plunger height of a cylinder plunger of the pressure cylinder of another nozzle branch. Through the selection or the setting of a plunger height of a cylinder plunger, it is advantageously possible to adapt an effective delivery volume, in particular in a structurally identical pressure cylinder and/or pressure cylinder module. In this way, it is possible to set an individual effective delivery volume, in particular for individual nozzle branches. For example, for a nozzle branch that provides a supply to a cleaning nozzle for a sensor surface which is relatively large or for which relatively intense fouling is to be expected, a relatively large effective delivery volume can be set by way of a small plunger height.

In an embodiment, provision is made for the bypass valve to be configured as a 2/2 directional valve, in particular 2/2 directional solenoid valve and/or cartridge valve. The 2/2 directional valve is preferably configured as a normally-closed 2/2 directional valve. "Normally-closed valve" means that the valve, in particular the 2/2 directional valve, is situated in its closed position when in the non-activated, in particular electrically deenergized state.

In an embodiment, provision is made for the bypass valve to be configured as an in particular normally-open 3/2 directional valve, wherein the 3/2 directional valve is configured to produce a pneumatic connection between the module compressed-air port and the compressed-air nozzle line in an open position, and to produce a pneumatic connection between the compressed-air nozzle line and an exhaust port of the 3/2 directional valve in a closed position. Such a refinement with a bypass valve configured as a 3/2 directional valve advantageously allows the connection of a quick exhaust valve, in particular for the purposes of generating compressed-air pulses.

In an embodiment, provision is made for the bypass valve to be formed as an arrangement composed of an in particular normally-open 3/2 directional valve and a quick exhaust valve, wherein the 3/2 directional valve is configured to produce a pneumatic connection between the module compressed-air port and the quick exhaust valve in an open position, and to produce a pneumatic connection between the quick exhaust valve and an exhaust port of the 3/2 directional valve in a closed position, the quick exhaust valve is arranged between the bypass valve and the compressed-air nozzle line or in a compressed-air nozzle connection line that pneumatically connects the cleaning nozzle to the compressed-air nozzle line, and the quick exhaust valve is configured to admit the bypass compressed-air flow and to provide a bypass compressed-air cleaning pulse. Via the arrangement composed of a 3/2 directional valve and a quick exhaust valve, a bypass compressed-air cleaning pulse can advantageously be generated in a nozzle branch—independently of the pressure cylinder in the nozzle branch. In relation to a bypass compressed-air flow, it is possible via the quick exhaust valve for a bypass compressed-air cleaning pulse to be generated that has a relatively high pressure and/or a relatively high velocity, for improved cleaning performance. The bypass compressed-air cleaning pulse, in particular the volume thereof, can be set via a corresponding structural configuration of a compressed-air buffer of the quick exhaust valve.

In an embodiment in which the bypass valve is formed as an arrangement composed of a 3/2 directional valve and a quick exhaust valve, the 3/2 directional valve is preferably formed as a normally-open valve. "Normally-open valve" means that the valve, in this case the 3/2 directional valve, is situated in its open position when in the non-activated, in particular electrically deenergized state, and is switched into its closed position—which vents the quick exhaust valve at its second port for the purposes of releasing the bypass compressed-air cleaning pulse—only when a bypass compressed-air cleaning pulse is to be provided. In particular, the quick exhaust valve is arranged between the bypass valve and the cleaning nozzle.

This has the advantage that the 3/2 directional valve is situated in its open position when in the non-activated state, and is switched into its closed position—which vents the quick exhaust valve at the second port for the purposes of releasing the bypass compressed-air cleaning pulse—only when a bypass compressed-air cleaning pulse is to be provided.

In an embodiment, provision is made for the bypass valve to be configured as an in particular normally-closed 3/2 directional valve, wherein the 3/2 directional valve is configured to produce a pneumatic connection between the module compressed-air port and the compressed-air nozzle line in an open position, and to produce a pneumatic connection between the quick exhaust valve and an exhaust port of the 3/2 directional valve in a closed position. In the closed position, the exhaust port may be blocked or open. In such a refinement, a 3/2 directional valve, which is in particular formed as a standard pneumatic component, for example as a cartridge valve, can be effectively utilized with the function of a 2/2 directional valve. By contrast to a refinement in which the bypass valve is formed from an arrangement composed of a 3/2 directional valve and a quick exhaust valve, the 3/2 directional valve in this refinement is preferably formed as a normally-closed valve which is activated, and thus switched into its open position, for the purposes of providing a bypass compressed-air flow. In such refinements, it is possible for an approximately structurally identical switching valve to be used both for embodiments with a quick exhaust valve and for embodiments without a quick exhaust valve, wherein, in the second case, the switching valve merely needs to be adapted by blocking of the exhaust port (and optionally by modification from normally-open to normally-closed).

In an embodiment, provision is made for at least two pressure cylinders to be assigned to one nozzle branch in such a way that the air chamber ports of the at least two pressure cylinders are pneumatically connected to a single switching valve. In such a refinement, the effective delivery volume of a nozzle branch can advantageously be enlarged, in particular multiplied, by joint switching of several pressure cylinders of a nozzle branch via a single switching valve. In particular, such a nozzle branch with at least two pressure cylinders may be assigned to one cleaning nozzle, or to a number of cleaning nozzles assigned to one sensor surface. In this way, the expenditure on equipment for providing a supply to one or more cleaning nozzles for cleaning relatively large sensor surfaces, for example a surface of a LIDAR or RADAR sensor, can be advantageously reduced, in particular through the omission of one or more switching valves.

In an embodiment, at least four nozzle branches and/or four pressure cylinders are provided. Such a refinement represents a suitable number of nozzle branches and/or pressure cylinders for a vehicle, in particular for a passenger motor vehicle. Nevertheless, different numbers of nozzle branches and/or pressure cylinders, for example two or eight, are possible within the scope of the disclosure.

In an embodiment, a module control connection is provided. A module control connection advantageously allows a central connection of all control lines, in particular for the switching valves and/or bypass valves of the multi-channel cleaning apparatus. The module control connection is in particular formed as a standardized plug and/or plug connection.

In an embodiment, a module control unit is provided which is configured for communication between the multi-channel cleaning apparatus, in particular the module control connection of the multi-channel cleaning apparatus, and a vehicle control unit of the vehicle, in particular via a vehicle bus. In particular, the module control unit is configured to convert control signals 1022 that are transmitted via the vehicle bus 1026 into switching signals for switching valves and/or bypass valves, and vice versa.

In a second aspect, the disclosure specifies a multi-channel sensor cleaning module, including a module housing, in particular a valve cartridge housing, and a multi-channel cleaning apparatus according to the first aspect of the disclosure. The advantages of the multi-channel cleaning apparatus are utilized to corresponding advantage in the multi-channel sensor cleaning module. In particular, the integration of the multi-channel cleaning apparatus in the form of a self-contained multi-channel sensor cleaning module with defined interfaces and/or ports allows improved integration into a vehicle, in particular with relatively little installation effort. Also, a multi-channel sensor cleaning module of the type allows improved retrofitting in existing vehicles. A valve cartridge housing is in particular formed as a block from aluminum or plastic or similar suitable material, into which block a number of valve inserts is introduced by suitable processing methods, with corresponding bores or similar air-conducting and/or fluid-conducting lines between the valve inserts and/or external ports.

In a third aspect, the disclosure specifies a vehicle, in particular passenger motor vehicle or utility vehicle or trailer, including at least one multi-channel cleaning apparatus according to the first aspect of the disclosure and/or a sensor cleaning module according to the second aspect of the disclosure. The advantages of the multi-channel cleaning apparatus according to the first aspect of the disclosure and/or a sensor cleaning module according to the second aspect of the disclosure can be advantageously utilized in a vehicle according to the third aspect of the disclosure. In particular, reliable cleaning of sensor surfaces of the sensors of the vehicle via an improved multi-channel cleaning apparatus according to the concept of the disclosure allows more reliable functioning of driver assistance functions, autonomous driving functions and/or partially autonomous driving functions of the vehicle that are based on the sensors. The trailer may in particular be configured as a utility vehicle trailer or passenger motor vehicle trailer.

BRIEF DESCRIPTION OF DRAWINGS

The invention will now be described with reference to the drawings wherein.

DETAILED DESCRIPTION

Figure 1:
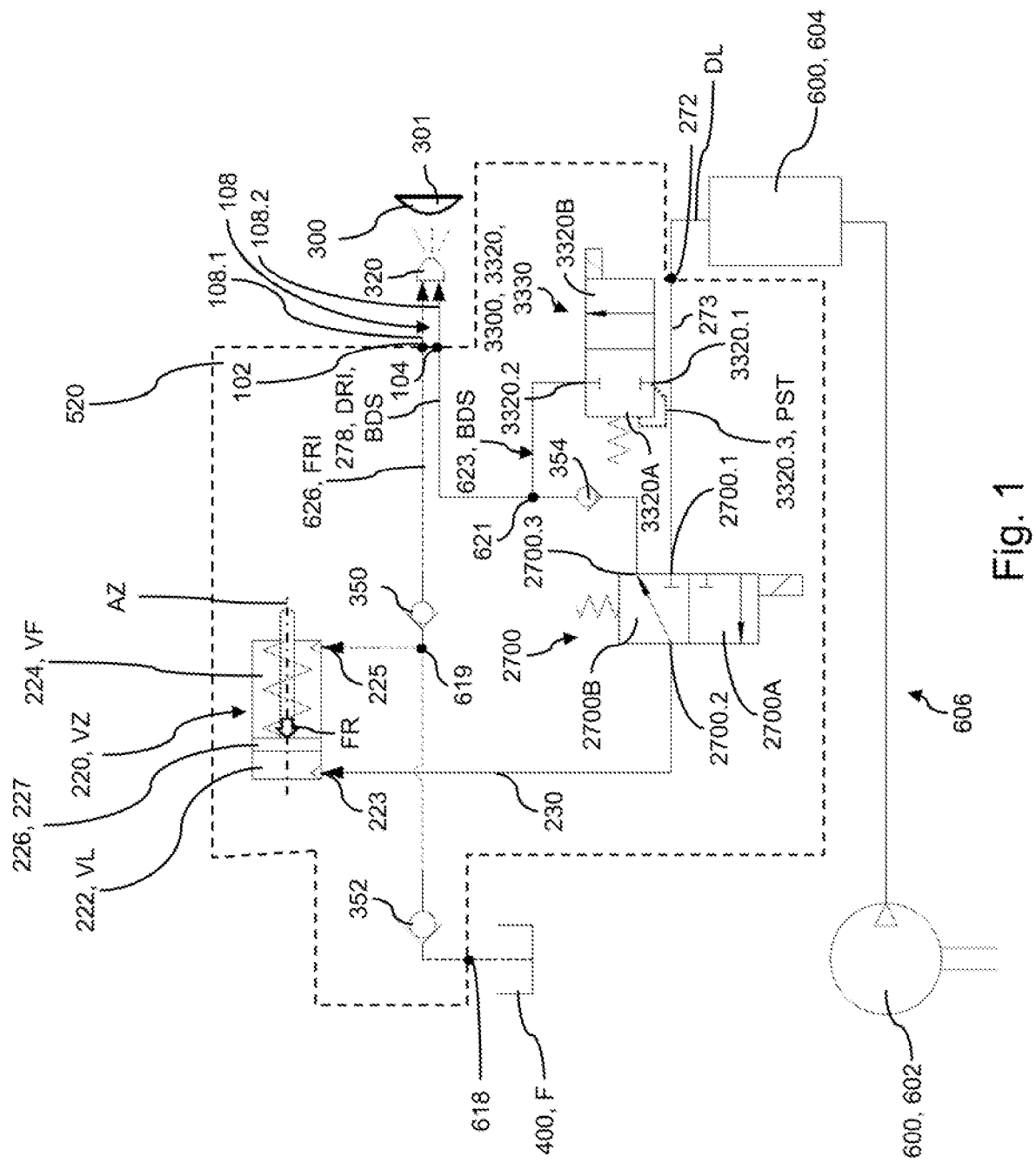
FIG. 1 is a schematic of a preferred nozzle branch of a multi-channel cleaning apparatus according to the disclosure.

FIG. 1 shows a nozzle branch 520 of a multi-channel cleaning apparatus 100 according to the disclosure. The nozzle branch 520 is configured to provide compressed air DL in the form of a compressed-air cleaning pulse DRI at a nozzle compressed-air port 104 and to provide cleaning liquid F in the form of a liquid cleaning pulse FRI at a nozzle liquid port 102. The nozzle branch 520 is pneumatically connected to a module compressed-air port 272 of the multi-channel cleaning apparatus 100, wherein the module compressed-air port 272 is configured to admit compressed air DL from a compressed-air source 600, in particular a compressor 602 and/or a pressure accumulator 604 of a compressed-air supply system 606. The module compressed-air port 272 is pneumatically connected via a compressed-air connection line 273 to a first port 2700.1 of a switching valve 2700. The switching valve 2700 is in the present case configured as a 3/2 directional solenoid valve.

The nozzle branch 520 is connected in fluid-conducting fashion to a module liquid port 618 of the multi-channel cleaning apparatus 100. The module liquid port 618 is configured to admit cleaning liquid F from a liquid source 400. The liquid source 400 may in particular be in the form of a tank that holds cleaning liquid F.

The nozzle branch 520 furthermore has a pressure cylinder 220 with a separating means 226 which is configured as a cylinder plunger 227 and which is movable axially along a cylinder axis AZ and which variably divides a cylinder volume VZ of the pressure cylinder 220 into an air chamber 222 and a liquid chamber 224. The pressure cylinder 220 has, in the region of the air chamber 222, an air chamber port 223 via which compressed air DL can be applied to the air chamber 222 in order to fill the air chamber 222. Pressurization of the air chamber port 223 causes an expansion of an air chamber volume VL of the air chamber 222, with the separating means 226 being moved counter to a restoring force FR, with a liquid chamber volume VF of the liquid chamber 224 simultaneously decreasing in size. In the present case, the separating means 226 in the form of the cylinder plunger 227 is held in the pressure cylinder 220 by a restoring spring 228, whereby the restoring spring 228 generates the restoring force FR when the cylinder plunger 227 is deflected. The air chamber port 223 is pneumatically connected via an air chamber line 230 to a second outlet 2700.2 of the switching valve 2700.

In the region of the liquid chamber 224, the pressure cylinder 220 has a liquid chamber port 225 via which the liquid chamber 224 is connected in fluid-conducting fashion to the liquid nozzle line 626. The liquid chamber port 225 is connected in fluid-conducting fashion at a cylinder connection point 619 to the liquid nozzle line 626. Application of compressed air DL to the air chamber port 223, and a movement of the separating means 226 counter to the restoring force FR, cause a quantity of cleaning liquid F that is held in the liquid chamber 224 to be provided, via the liquid chamber port 225 and via the cylinder connection point 619 and the liquid nozzle line 626, in the form of a liquid cleaning pulse FRI at the nozzle liquid port 102 for at least one cleaning nozzle 320. This occurs by virtue of the liquid chamber volume VF of the liquid chamber 224 being decreased in size as a result of the movement of the separating means 226, and the cleaning liquid F thus being forced out of the pressure cylinder 220, in particular in the form of a pulse.

The nozzle compressed-air port 104 is pneumatically connected via the compressed-air nozzle line 278 to a third port 2700.3 of the switching valve 2700.

An induction pressure check valve 350 is arranged in the liquid nozzle line 626 between the cylinder connection point 619 and the nozzle liquid port 102.

A liquid pulse check valve 352 is arranged in the liquid nozzle line 626 between the cylinder connection point 619 and the module liquid port 618. The liquid pulse check valve 352 prevents cleaning liquid F from escaping in the direction of the module liquid port 618 during the provision of the liquid cleaning pulse FRI.

In an air admission position 2700A of the switching valve 270, the first port 2700.1 is pneumatically connected to the second port 2700.2, and the third port 2700.3 is blocked. In this air admission position 2700A, an air pressure prevailing at the module compressed-air port 272 is thus transmitted onward to the air chamber port 223, which results in an expansion of the air chamber 222 and the provision of a liquid cleaning pulse FRI at the nozzle liquid port 102. The liquid cleaning pulse FRI is consequently applied via the cleaning nozzle 320 to a sensor surface 300.

In a venting position 2700B of the switching valve 2700, as illustrated here, the second port 2700.2 is pneumatically connected to the third port 2700.3, and the first port 2700.1 is blocked. This venting position 2700B results in venting of the air chamber port 223, whereby the separating means 226 performs a return movement under the action of the restoring force FR, and the air chamber volume VL of the air chamber 222 decreases in size, and the liquid chamber volume VF of the liquid chamber 224 increases in size. The return movement of the separating means 226 gives rise to a negative pressure at the liquid chamber port 225. Owing to the induction pressure check valve 350, the negative pressure acts only at the module liquid port 618 (and not at the nozzle liquid port 102), whereby new cleaning liquid F is inducted into the liquid chamber 224 from the liquid source 400, in particular without a pump or similar delivery device being required.

At the same time, the return movement of the separating means 226 gives rise to a positive pressure at the air chamber port 223, which positive pressure results in a flow of compressed air DL via the second port 2700.2 and the third port 2700.3 to the nozzle compressed-air port 104, whereby a compressed-air cleaning pulse DRI is provided at the nozzle compressed-air port 104. Consequently, the compressed-air cleaning pulse DRI is applied to the sensor surface 300 via the cleaning nozzle 320 for cleaning purposes. The switching valve 270 has, in particular, a relatively large nominal width in order to advantageously transmit the cleaning compressed-air pulse to the compressed-air nozzle line 278 without pressure loss. In particular, the switching valve has a nominal width that is greater than or equal to the diameter of the compressed-air nozzle line 278 and/or of the air chamber line 230.

A cleaning process operation is thus complete, and may be repeated as required by virtue of the switching valve 2700 being switched back into the air admission position 2700A.

The nozzle branch 520 furthermore has a bypass valve 3300 and a compressed-air pulse check valve 354. The bypass valve 3300 is in the present case in the form of a 2/2 directional valve 3320, specifically a 2/2 directional solenoid valve 3330. The 2/2 directional valve 3320 is pneumatically connected via a first port 3320.1 to the compressed-air connection line 273 and via a second port 3320.2 and a bypass line 623 to a bypass connection point 621 of the compressed-air nozzle line 278.

The compressed-air pulse check valve 354 is arranged in the compressed-air nozzle line 278 between the third port 2700.3 of the switching valve 2700 and the bypass connection point 621.

In a closed position 3320A of the 2/2 directional valve 3320 or of the bypass valve 3300, the first port 3320.1 is pneumatically separated from the second port 3320.2. In this closed position 3320A, the functioning of the multi-channel cleaning apparatus 100 of the pressure cylinder 220 is as described above. However, by virtue of the bypass valve 3300 being switched, compressed air DL can be supplied to the nozzle compressed-air port 104 directly from the module compressed-air port 272, bypassing the switching valve 2700. In the present case, this occurs by virtue of the bypass valve 3300 in the form of the 2/2 directional valve 3320 being switched into an open position 3320B, in which the first port 3320.1 is pneumatically connected to the second port 3320.2. In this way, the compressed air DL that is present at the module compressed-air port 272 can be transmitted directly via the bypass connection point 621 and the compressed-air nozzle line 278 in order to provide a bypass compressed-air flow BDS at the nozzle compressed-air port 104. The bypass valve 3300 thus advantageously makes it possible for compressed air DL, in particular a bypass compressed-air flow BDS, to be applied to the sensor surface 300 without the pressure cylinder 220 being actuated.

The compressed-air pulse check valve 354 ensures that— when the 2/2 directional valve 3320 is in the open position 3320B and the switching valve is in the venting position 2700B— the compressed air DL cannot flow in the direction of the switching valve 2700 and thus into the air chamber 222 of the pressure cylinder 220.

The 2/2 directional valve 3320 may optionally have, at the first port 3320.1, a control line 3320.3 for providing a control pressure PST.

The multi-channel cleaning apparatus 100 may furthermore have a nozzle connection line 108 that is configured to connect one or more cleaning nozzles 320 in air-conducting and/or fluid-conducting fashion to the multi-channel cleaning apparatus 100. The nozzle connection line 108 may be configured as a common line that is configured to conduct both compressed air and cleaning liquid simultaneously and/or successively. In other preferred embodiments, the nozzle connection line 108 may have a liquid nozzle connection line 108.1 and a compressed-air nozzle connection line 108.2 and thus be configured for conducting the media separately to the cleaning nozzle 320.

Figure 2:
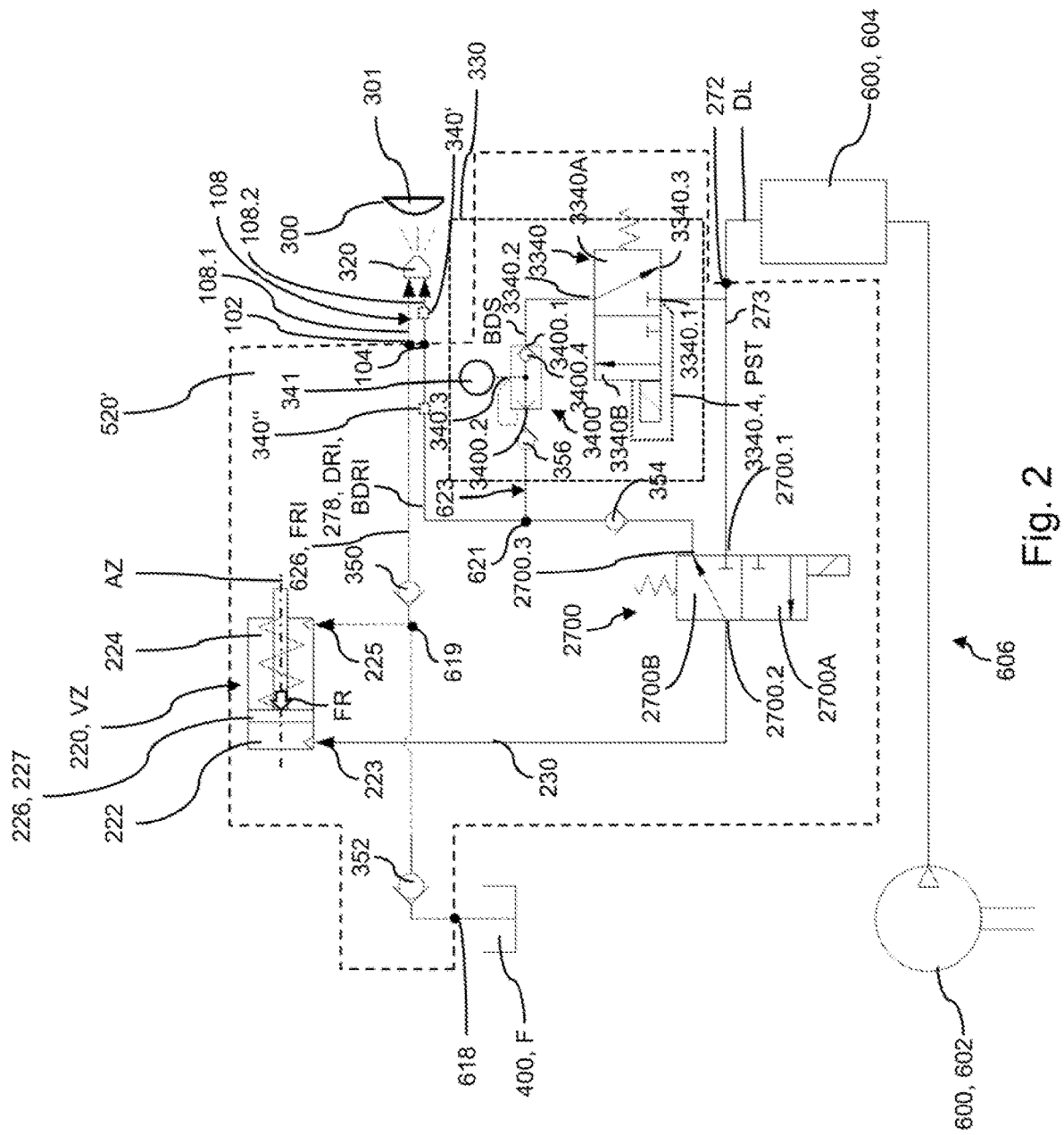
FIG. 2 is a schematic of a further preferred nozzle branch of a multi-channel cleaning apparatus according to the disclosure.

FIG. 2 shows a further preferred nozzle branch 520' for a multi-channel cleaning apparatus 100' according to the concept of the disclosure, which, by contrast to the nozzle branch 520 shown in FIG. 1, has, as a bypass valve 3300, an arrangement composed of a 3/2 directional valve 3340 and additionally a quick exhaust valve 3400. The quick exhaust valve 3400 is arranged in the bypass line 623. Via the quick exhaust valve 3400, it is advantageously possible for a pulse-like bypass compressed-air cleaning pulse BDRI to be generated and provided at the nozzle compressed-air port 104 on the basis of the bypass compressed-air flow BDS, which in particular takes the form of a continuous flow.

The quick exhaust valve 3400 has a first port 3400.1 that pneumatically connects the quick exhaust valve 3400 to the second port 3340.2 of the 3/2 directional valve 3340. The quick exhaust valve 3400 has a second port 3400.2 that pneumatically connects the quick exhaust valve 3400 to the bypass connection point 621. The quick exhaust valve 3400 furthermore has a third port 3400.3, to which a compressed-air buffer 341 of the quick exhaust valve 3400 is pneumatically connected. The quick exhaust valve 3400 is formed in the manner of a selector valve with a valve element 3400.4, which valve element blocks that one of the first port 3400.1 and the second port 3400.2 at which the lower air pressure prevails, and which valve element pneumatically connects the respective other port to the third port 3400.3.

Furthermore, in the bypass line 623 between the second port 3340.2 of the 3/2 directional valve 3340 and the bypass connection point 621, there is arranged a bypass check valve 356 which opens in a flow direction from the 3/2 directional valve 334 to the bypass connection point 621 and which blocks in the opposite direction. In an open position 3340B of the 3/2 directional valve 3340-analogously to the open position 3320B of the 2/2 directional valve 3320 shown in FIG. 2-a first port 3340.1, leading to the compressed-air connection line 273, of the 3/2 directional valve 3340 is pneumatically connected to the second port 3340.2. This has the result that compressed air DL prevailing at the module compressed-air port 272 is transmitted in the form of the bypass compressed-air flow BDS to the first port 3400.1 of the quick exhaust valve 3400, whereby the valve element 3400.4 is forced against the second port 3400.2 with blocking action, and the compressed-air buffer 341 is filled with compressed air DL via the third port 3400.3. If the 3/2 directional valve 3340 is now switched into a closed position 3340A, the second port 3340.2 is pneumatically connected to a third exhaust port 3340.3, which in particular vents into the surroundings, and the first port 3340.1 is blocked. As a result, the air pressure at the first port 3400.1 of the quick exhaust valve falls to ambient pressure, and the valve element 3400.4 is, in particular through a quick exhaust valve control line 3400.5, forced against the first port 3400.1 with blocking action by the pressure of the compressed air DL that is stored in the compressed-air buffer 341. The second port 3400.2 is consequently opened, whereby the compressed air DL that is stored in the compressed-air buffer 341 can be provided in the form of the bypass compressed-air cleaning pulse BDRI, via the second port 3400.2 and also the bypass connection point 621 and the compressed-air nozzle line 278, at the nozzle compressed-air port 104. Here, the compressed-air pulse check valve 354 prevents a flow of the bypass compressed-air cleaning pulse BDRI in the direction of the switching valve 2700.

By virtue of the 3/2 directional valve 3340 being switched back into the open position 3340B, the compressed-air buffer 341 can be filled with compressed air DL again, and the process for generating the bypass compressed-air cleaning pulse BDRI can be repeated—as required and in particular as often as desired and independently of the pressure cylinder 220.

Independently of the generation of a bypass compressed-air flow BDS and/or of a bypass compressed-air cleaning pulse BDRI, a compressed-air cleaning pulse DRI and/or a liquid cleaning pulse FRI can be generated in a known manner via the pressure cylinder 220 and the switching valve 2700— as described in conjunction with FIG. 1.

In the case of the nozzle branch 520' shown in FIG. 2, the bypass check valve 356 prevents a compressed-air cleaning pulse DRI, which is generated by the pressure cylinder 220 and which is conducted via the switching valve 2700 in its venting position 2700B to the compressed-air nozzle line 278, from being able to pass to the quick exhaust valve 3400.

The 3/2 directional valve 3340 may optionally have, at the first port 3340.1, a control line 3340.4 for providing a control pressure PST.

The 3/2 directional valve 3340 is in particular configured as a normally-open valve, that is, the 3/2 directional valve 3340 is situated in the open position 3340B when in a non-activated, in particular electrically deenergized state, and switches into the closed position 3340A when in an activated, in particular electrically energized state. In this way, the 3/2 directional valve 3340 only needs to be activated, in particular electrically energized, in order to emit the bypass compressed-air cleaning pulse BDRI.

In general, with regard to the least possible pressure losses and thus the strongest possible bypass compressed-air cleaning pulse BDRI, it is advantageous to keep the line length between the quick exhaust valve 340 and the cleaning nozzle 320 as short as possible. In alternative preferred embodiments, instead of the quick exhaust valve 340 shown, it is possible for an alternative further quick exhaust valve 340' (illustrated in highly simplified form here) to be arranged closer to the cleaning nozzle 320, for example between the compressed-air nozzle port 104 and the cleaning nozzle 320, in the compressed-air nozzle line 108.2, or alternatively as a yet further quick exhaust valve 340" in the compressed-air nozzle line 278. The cleaning nozzle 320, the nozzle connection line 108 and the quick exhaust valve 340 may in this case be formed in particular as part of the multi-channel cleaning apparatus 100.

In embodiments—in particular with an alternative further quick exhaust valve 340' or an alternative yet further quick exhaust valve 340", but also in embodiments without quick exhaust valves—it is advantageously possible for the third port 2700.3 of the switching valve 2700 not to be connected to the compressed-air nozzle line 278, but rather to be configured to vent directly into the surroundings in the venting position 2700B. In such embodiments, it is thus possible for the compressed-air pulse check valve 354 and/or the bypass check valve 356 and/or the line between the third port 2700.3 of the switching valve 2700 and the bypass connection point 621 to be omitted. Thus, in such embodiments, no compressed-air cleaning pulse DRI generated by the pressure cylinder 220 is provided at the compressed-air nozzle line 278, but a structural simplification of the multi-channel cleaning apparatus 100 is advantageously achieved, in particular through the omission of the check valve 354, 356. The bypass line 623 and the compressed-air nozzle line 278 directly coincide in this embodiment, and are configured to conduct the bypass compressed-air flow BDS and/or a bypass compressed-air cleaning pulse BDRI from the bypass valve 330 to the compressed-air nozzle port 104.

Figure 3:
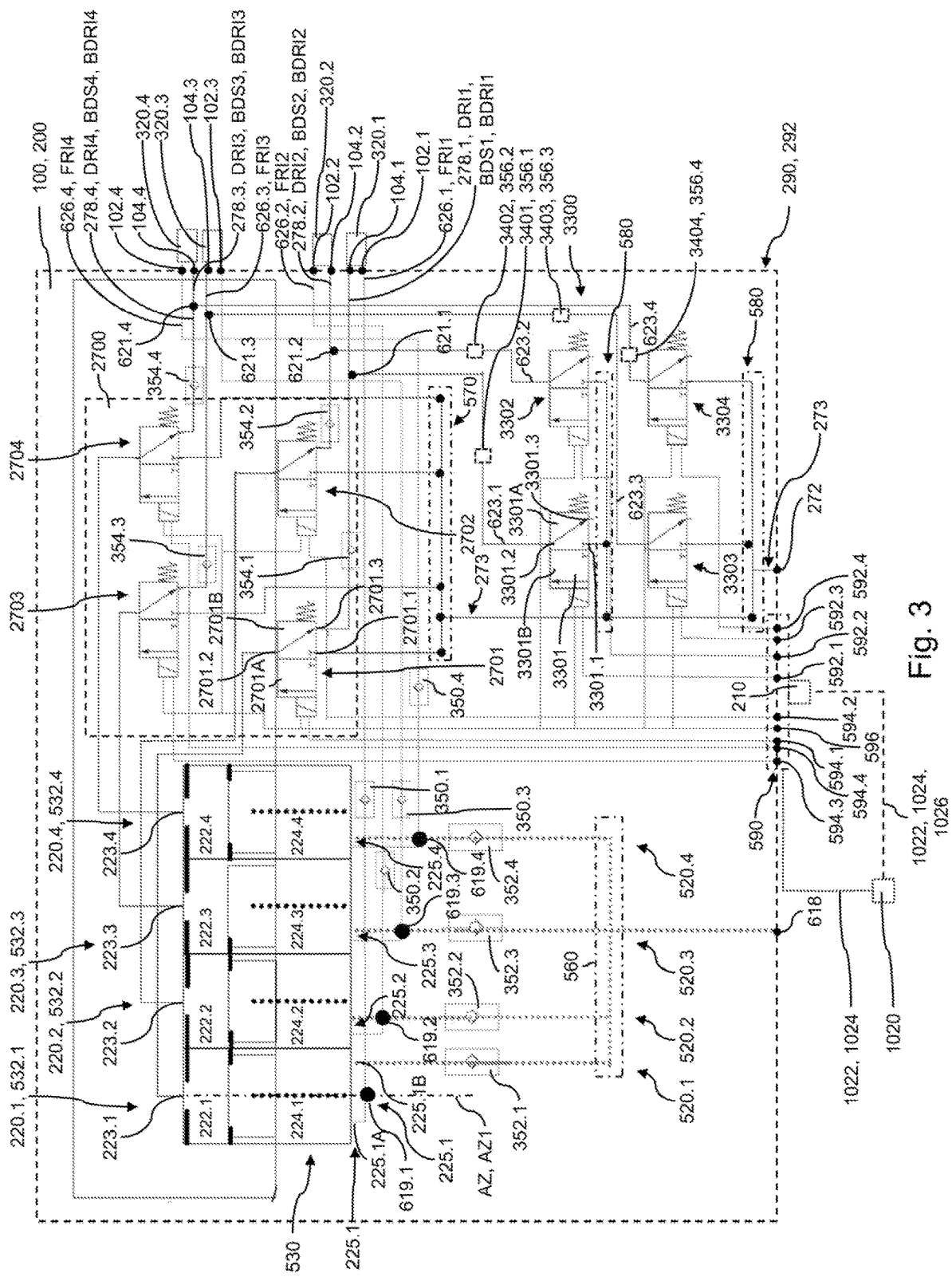
FIG. 3 shows a preferred embodiment of a multi-channel cleaning apparatus according to the disclosure.

FIG. 3 shows a multi-channel cleaning apparatus 100 according to the concept of the disclosure with four nozzle branches 520, specifically a first nozzle branch 520.1, a second nozzle branch 520.2, a third nozzle branch 520.3 and a fourth nozzle branch 520.4. Here, each nozzle branch 520 has a switching valve 2700, a pressure cylinder 220 and a bypass valve 3300, which are each numbered in accordance with their associated nozzle branch. The four pressure cylinders 220.1, 220.2, 220.3, 220.4 are each configured as a pressure cylinder module 532.1, 532.2, 532.3, 532.4 and are assembled together, in particular screwed to one another, to form a pressure cylinder block 530. The pressure cylinder module 532 and/or the pressure cylinder block 530 are in particular formed from a suitable material, in particular from a plastic that exhibits adequate strength or from aluminum.

In the present case, each pressure cylinder 220.1, 220.2, 220.3, 220.4 has, as shown here by way of example only at the first pressure cylinder 220.1, a first part 225.1A, which leads to the module liquid port 618, of the liquid chamber port 225.1, and a second part 225.18, which leads to the liquid nozzle line 626.1, of the first liquid chamber port 225.1.

In all embodiments, it is alternatively possible for a single liquid chamber port 225.1, 225.2, 225.3, 225.4 to be provided at each pressure cylinder 220, which liquid chamber port is—as shown in FIG. 1 and FIG. 2—connected via a cylinder connection point 619, 619.1, 619.2, 619.3, 619.4 (schematically indicated here) to the liquid nozzle line 626. Via a cylinder connection point 619, a pressure cylinder 220 can be connected in a structurally advantageously simplified manner, via only a single fluid-conducting connection, to the respective liquid nozzle line 626.

Each nozzle branch 520 has both a nozzle liquid port 102 and a nozzle compressed-air port 104, that is, the first nozzle branch 520.1 has a first nozzle liquid port 102.1 for providing a first compressed-air cleaning pulse DRI1 and has a first nozzle compressed-air port 104.1 for providing a first liquid cleaning pulse FRI1, the second nozzle branch 520.2 has a second nozzle liquid port 102.2 for providing a second liquid cleaning pulse FRI2 and has a second nozzle compressed-air port 104.2 for providing a second compressed-air cleaning pulse DRI2, the third nozzle branch 520.3 has a third nozzle liquid port 102.3 for providing a third liquid cleaning pulse FRI3 and has a third nozzle compressed-air port 104.3 for providing a third compressed-air cleaning pulse DRI3, and the fourth nozzle branch 520.4 has a fourth nozzle liquid port 102.4 for providing a fourth liquid cleaning pulse FRI4 and has a fourth nozzle compressed-air port 104.4 for providing a fourth compressed-air cleaning pulse DRI4. One or more cleaning nozzles 320 may be connected in each case to a combination composed of a nozzle liquid port 102 and a nozzle compressed-air port 104 of a nozzle branch 520 for the purposes of a supply of compressed air DL and cleaning liquid F. In the present case, by way of example, one cleaning nozzle 320 is provided per nozzle branch 520, specifically a first cleaning nozzle 320.1 for the first nozzle branch 520.1, a second cleaning nozzle 320.2 for the second nozzle branch 520.2, a third cleaning nozzle 320.3 for the third nozzle branch 520.3 and a fourth cleaning nozzle 320.4 for the fourth nozzle branch 520.4.

The multi-channel cleaning apparatus 100 has a liquid distributor 560 that connects the module liquid port 618 in fluid-conducting fashion to the individual liquid nozzle lines 626.1, 626.2, 626.3, 626.4.

The multi-channel cleaning apparatus 100 has a compressed-air distributor 570 that pneumatically connects the module compressed-air port 272 to the switching valves 2701, 2702, 2703, 2704, in particular to the first port 2701.1, 2702.1, 2703.1, 2704.1 thereof.

The multi-channel cleaning apparatus 100 has a compressed-air bypass distributor 580 which—shown in two parts in FIG. 3—pneumatically connects the module compressed-air port 272 to the bypass lines 623.1, 623.2, 623.3, 623.4.

The multi-channel cleaning apparatus 100 has a module control connection 590 which may be configured as an in particular standardized plug connection for the connection of a suitable plug of a vehicle control line 1024, in particular for the signal-transmitting connection of the multi-channel cleaning apparatus 100 and/or of the sensor cleaning module 200 to a vehicle control unit 1020 of the vehicle 1000. Alternatively or in addition, the multi-channel cleaning apparatus 100 may have a module control unit 210 which is configured to be connectable in signal-transmitting fashion to the vehicle control unit 1020 of the vehicle 1000, in particular via a vehicle control line 1024, configured as a vehicle bus 1026. The module control unit 210 serves in particular as an interface between the cleaning apparatus 100 and the vehicle control unit 1020 and allows signal-transmitting communication via the vehicle bus 1026 using a suitable protocol, in particular CAN. The vehicle bus 1026 is configured in particular as a CAN bus.

The module control connection 590 may have a bypass control connection 592 for each nozzle branch 520, in the present case a first bypass control connection 592.1, a second bypass control connection 592.2, a third bypass control connection 592.3 and a fourth bypass control connection 592.4, each bypass control connection 592.1, 592.2, 592.3, 592.4 being connected in signal-transmitting fashion, in particular for the transmission of a control signal, to the bypass valve 3301, 3302, 3303, 3304 of the respective nozzle branch 520.1, 520.2, 520.3, 520.4.

Each nozzle branch 520 has a bypass valve 3300, which is arranged in the respective bypass line 623, for providing a bypass compressed-air flow BDS. The first nozzle branch 520.1 has, in a first bypass line 623.1, a first bypass valve 3301 for providing a first bypass cornpressed-air flow BDS1. The second nozzle branch 520.2 has, in a second bypass line 623.2, a second bypass valve 3302 for providing a second bypass compressed-air flow BDS2. The third nozzle branch 520.3 has, in a third bypass line 623.3, a third bypass valve 3303 for providing a third bypass compressed-air flow BDS3. The fourth nozzle branch 520.4 has, in a fourth bypass line 623.4, a fourth bypass valve 3304 for providing a fourth bypass compressed-air flow BDS4.

The module control connection 590 may have a switching valve control connection 594 for each nozzle branch 520, in the present case a first switching valve control connection 594.1, a second switching valve control connection 594.2, a third switching valve control connection 594.3 and a fourth switching valve control connection 594.4, each switching valve control connection 594.1, 594.2, 594.3, 594.4 being connected in signal-transmitting fashion, in particular for the transmission of a control signal, to the switching valve 2701, 2702, 2703, 2704 of the respective nozzle branch 520.1, 520.2, 520.3, 520.4.

The module control connection 590 may furthermore have a ground connection 596, in particular a single ground connection 596 for all bypass valves 3301, 3302, 3303, 3304 and switching valves 2701, 2702, 2703, 2704 of the multi-channel cleaning apparatus 100.

The components of each nozzle branch 520 have already been described in FIG. 1 or FIG. 2 and are denoted by corresponding numbering in FIG. 3 (the decimal point indicates the assignment to the respective nozzle branch, with the exception of the four-digit reference designations for the valves, where the fourth digit denotes the assignment to the nozzle branch and the decimal point denotes the respective port).

For the sake of clarity, the ports of the switching valve 2700 and of the bypass valve 3300 have been labelled only for the first switching valve 2701 and the first bypass valve 3301, and are correspondingly apparent for the other switching valves 2702, 2703, 2704 and bypass valves 3302, 3303, 3304.

The multi-channel cleaning apparatus 100 shown in FIG. 3 may optionally, in a manner illustrated in simplified form here, have an arrangement of a bypass valve 3300 with a quick exhaust valve 3400 in particular for each nozzle branch 520.1, 520.2, 520.3, 520.4, wherein, for each nozzle branch 520.1, 520.2, 520.3, 520.4, the quick exhaust valve 3400 is arranged, analogously to FIG. 2, in the respective bypass line 623.1, 623.2, 623.3, 623.4, specifically in each case in the sequence of bypass valve 3300, quick exhaust valve 3400, bypass check valve 356 and bypass connection point 621. Thus, in the present case, in each case together with a bypass check valve 356 as shown in FIG. 2, a first quick exhaust valve 3401 of the first nozzle branch 520.1 for providing a first bypass compressed-air cleaning pulse BDRI1 is arranged with a first bypass check valve 356.1 in a first bypass line 623.1, a second quick exhaust valve 3402 of the second nozzle branch 520.2 for providing a second bypass compressed-air cleaning pulse BDRI2 is arranged with a second bypass check valve 356.2 in a second bypass line 623.2, a third quick exhaust valve 3403 of the third nozzle branch 520.3 for providing a third bypass compressed-air cleaning pulse BDRI3 is arranged with a third bypass check valve 356.3 in a third bypass line 623.3, and a fourth quick exhaust valve 3404 of the fourth nozzle branch 520.4 for providing a fourth bypass compressed-air cleaning pulse BDRI4 is arranged with a fourth bypass check valve 356.4 in a fourth bypass line 623.4.

The multi-channel cleaning apparatus 100 shown in FIG. 3 may be housed in a module housing 290 in order to form a multi-channel sensor cleaning module 200. The module housing 290 may be formed from a suitable material, in particular from a plastic that exhibits adequate strength or from aluminum.

Figure 4B:
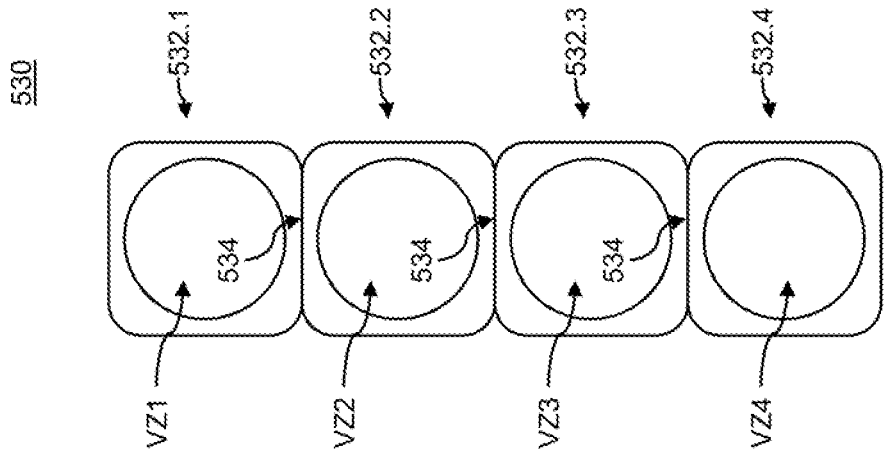
FIG. 4B shows a schematic plan view of four pressure cylinder modules for forming a pressure cylinder block; and, FIG. 5 is a schematic of a vehicle, in particular of a passenger motor vehicle or utility vehicle, including a multi-channel cleaning apparatus according to the disclosure.
Figure 4A:
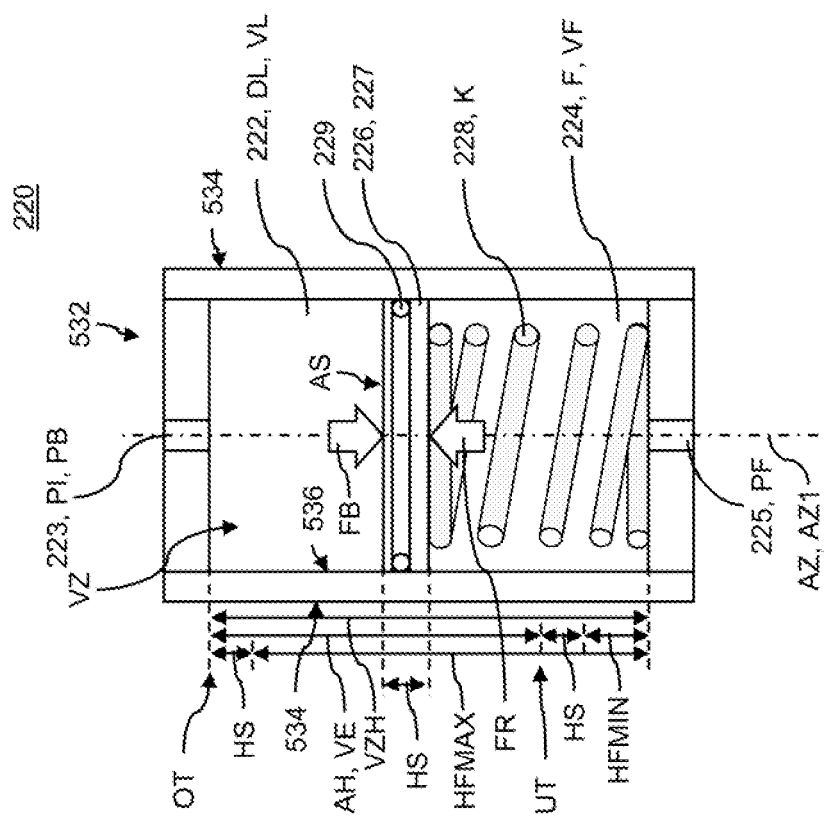
FIG. 4A shows a single pressure cylinder in the form of a pressure cylinder module in a lateral cross-sectional view.

FIG. 4A schematically shows a single pressure cylinder 220 in the form of a pressure cylinder module 532 in a lateral cross-sectional view. Multiple, in particular structurally identical, pressure cylinder modules 532 may be assembled together, in particular joined together, in particular by screw connection, in a row and so as to be adjacent to one another in each case at one module side 534, to form a pressure cylinder block 530. This is shown by way of example in FIG. 4B in a schematic plan view of four pressure cylinder modules 532.1, 532.2, 532.3, 532.4 for forming a pressure cylinder block 530. For a better arrangement of individual or multiple pressure cylinder modules 532 adjacent to one another, a pressure cylinder module 532 may in particular, as shown in FIG. 4B, have an approximately rectangular, in particular approximately square, external cross section.

FIG. 4A furthermore shows a separating means 226 in the form of a cylinder plunger 227 which is arranged within the cylinder volume VZ of the pressure cylinder 220 so as to be movable axially along the cylinder axis AZ and so as to bear in pressure-tight fashion against an inner wall 536 of the pressure cylinder 220. The cylinder plunger 227 thus variably divides the cylinder volume VZ into an air chamber 222, which accommodates compressed air DL and which has an air chamber volume VL, and a liquid chamber 224, which accommodates cleaning liquid F and which has a liquid chamber volume VF. The air chamber 222 is separated in fluid-tight fashion from the liquid chamber 224 by virtue of the cylinder plunger 227 bearing-circumferentially around the cylinder plunger 227-against the inner wall 536 of the pressure cylinder 220. Via an air chamber port 223, it is firstly possible for compressed air DL to be applied to the air chamber 222 with an application pressure PB, for the purposes of generating an application force FB that acts on the cylinder plunger 227, and it is secondly possible, for the purposes of providing a compressed-air cleaning pulse DRI, for the air chamber 222 to emit compressed air DL with a pulse pressure PI by virtue of the separating means 226 performing a return movement under the action of the restoring force. The pulse pressure is determined here in particular from the restoring force multiplied by the plunger area AS of the cylinder plunger 227. Via a liquid chamber port 225, the liquid chamber 224 can induct cleaning liquid F and can emit the cleaning liquid with a liquid pressure PF for the purposes of providing a liquid cleaning pulse FRI. The liquid pressure PF is dependent on the application pressure PB, though it is not possible for the entire application pressure PB to be utilized as liquid pressure PF at the liquid chamber port 225 because losses arise in overcoming the restoring force FR.

Optionally, for better sealing of the air chamber 222 from the liquid chamber 224, the cylinder plunger 227 may have a sealing ring 229, in particular composed of plastic and/or rubber.

The cylinder plunger 227 is held in the cylinder volume VZ of the pressure cylinder 220 by a restoring spring 228 such that, in the event of a deflection, in particular as a result of the application pressure PB being applied to the air chamber port 223, a restoring force FR is generated.

Here, the restoring spring 228 may advantageously be configured to move the cylinder plunger 227 with a stroke amplitude AH that extends along the cylinder axis AZ over a cylinder volume height VZH of the cylinder volume VZ minus a plunger height HS of the cylinder plunger 227 and minus a minimum spring height HFMIN of the restoring spring 228 in the compressed state. The restoring spring 228 may in particular have a maximum spring height HFMAX in order to achieve the stroke amplitude AH.

The stroke amplitude AH is dependent inter alia on the maximum spring height HFMAX. The stroke amplitude AH is the axial travel that the cylinder plunger 227 must cover in order to move from a bottom dead center UT to a top dead center OT. The stroke amplitude HA thus defines an effective delivery volume VE that determines the maximum volume of cleaning liquid F and/or compressed air DL that can be delivered per stroke.

Through the selection of a plunger height HS of a cylinder plunger 227, it is advantageously possible to influence the quantity of cleaning liquid F and compressed air DL delivered by the pressure cylinder 220, in particular without changing the shape and size of the pressure cylinder 220, in particular of the pressure cylinder module 532. Selecting a relatively large plunger height HS has the effect that a plunger volume VS of the cylinder plunger 227 is enlarged. The effective delivery volume VE is correspondingly decreased in size because a greater proportion of the cylinder volume VZ is already occupied by the plunger volume VS of the cylinder plunger 227. Correspondingly, in the case of a relatively large plunger height HS, the volume of compressed air DL and cleaning liquid F delivered by the pressure cylinder 220, that is, the volume of the compressed-air cleaning pulse DRI and of the liquid cleaning pulse FRI, is reduced.

The pressure cylinder 220 may have a cylinder volume VZ of between 5 ml and 80 ml, preferably between 10 ml and 40 ml, particularly preferably between 10 and 20 ml.

In an embodiment in which the pressure cylinder 220 has a cylinder volume VZ of 20 ml, and a plunger height HS of the cylinder plunger 220 is selected so as to result in a plunger volume VS of 8 ml, and if for simplicity one assumes a dead volume of 2 ml resulting from the minimum spring height HFMIN, then there is a remaining effective delivery volume VE of approximately around 10 ml that is available both for providing the compressed-air cleaning pulse DRI via the air chamber port 223 and providing the liquid cleaning pulse FRI via the liquid chamber port 225. This means that, in such a configuration, a compressed-air cleaning pulse DRI with a volume of 10 ml compressed air DL and a liquid cleaning pulse FRI with a volume of 10 ml cleaning liquid F can be provided.

Figure 5:
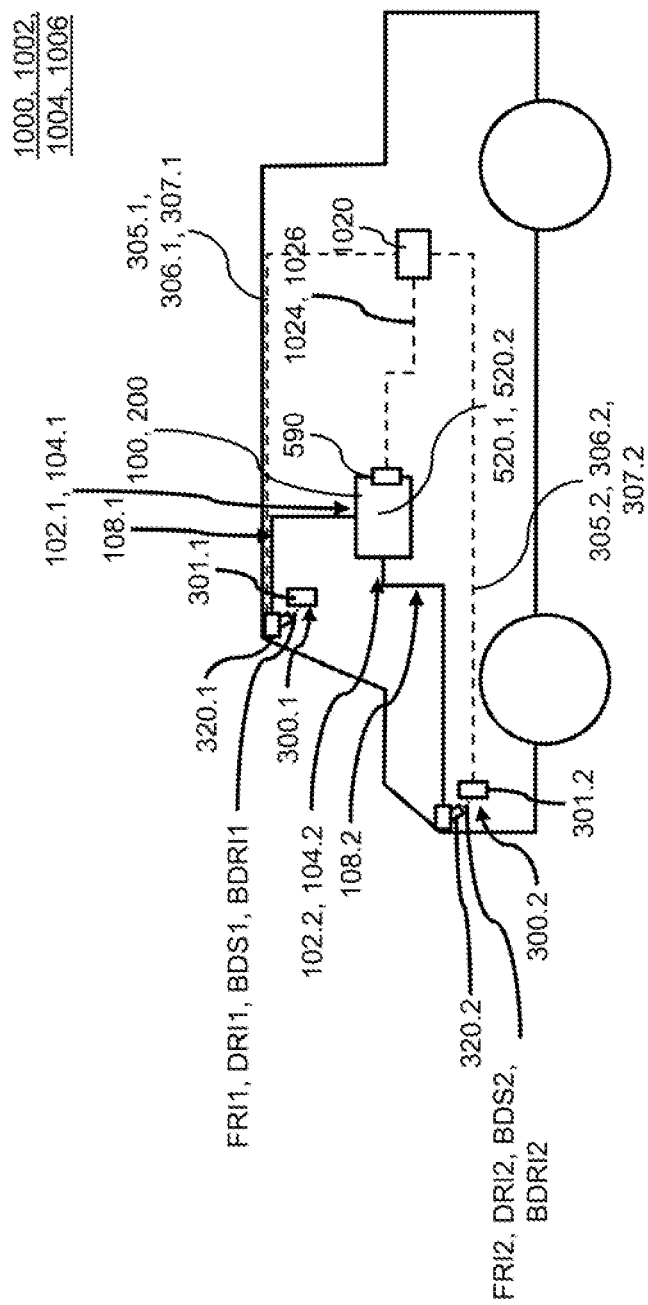

FIG. 5 is a schematic illustration of a vehicle 1000, in particular of a passenger motor vehicle 1002 or utility vehicle 1004 or trailer 1006, in the present case in the form of an autonomous or partially autonomous vehicle, including a multi-channel cleaning apparatus 100 with a number of nozzle branches 520 for a number of at least two cleaning nozzles 320, in the present case with a first nozzle branch 520.1 for a first cleaning nozzle 320.1 for cleaning a first sensor surface 300.1 of a first sensor 301.1, which is configured as an optical sensor, for example as a camera, and with a second nozzle branch 520.2 for a second cleaning nozzle 320.2 for cleaning a second sensor surface 300.2 of a second sensor 301.2, which is configured as an optical sensor, for example as a camera.

The multi-channel cleaning apparatus 100 may nevertheless be used in other vehicles.

The multi-channel cleaning apparatus 100 is configured in particular as a sensor cleaning module 200. The cleaning apparatus 100 has a module control port 590 that is connected in signal-transmitting fashion to a vehicle control unit 1020 via a vehicle control line 1024. The vehicle control line 1024 is configured in particular as a vehicle bus 1026, in particular CAN bus.

The first sensor 301.1 is connected in signal-transmitting fashion via a first sensor line 306.1 to the vehicle control unit 1020 for the transmission of first sensor signals 305.1. In particular, a first cleaning check signal 307.1 for establishing whether a first liquid cleaning pulse FRI1 has been emitted can be transmitted via the first sensor line 306.1 to the vehicle control unit 1020. Analogously, the second sensor 301.2 is connected in signal-transmitting fashion via a second sensor line 306.2 to the vehicle control unit 1020 for the transmission of second sensor signals 305.2, in particular of a second cleaning check signal 307.2.

In the case of a sensor 301.1, 301.2 configured as a camera, a cleaning check signal 307.1, 307.2 may be generated in particular using image recognition means, for example through the identification of liquid particles in the camera image.

Each cleaning nozzle 320.1, 320.2 is configured to apply a liquid cleaning pulse FRI1, FRI2 and/or a compressed-air cleaning pulse DRI1, DRI2 and/or a bypass compressed-air flow BDS1, BDS2 and/or a bypass compressed-air cleaning pulse BDRI1, BDRI2 to the respective sensor surface 300.1, 300.2.

Each cleaning nozzle 320.1, 320.2 is connected in fluid-conducting fashion, via a respective nozzle liquid port 102.1, 102.2 and nozzle compressed-air port 104.1, 104.2, to the multi-channel cleaning apparatus 100. In embodiments in which the cleaning nozzle 320 is not arranged directly at the cleaning apparatus 100 or at the sensor cleaning module 200, the cleaning nozzle 320 may be connected in fluid-conducting fashion via a nozzle connection line 108.1, 108.2 to the nozzle liquid port 102 and/or to the nozzle compressed-air port 104.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

100 Multi-channel cleaning apparatus
102 Nozzle liquid port
102.1 First nozzle liquid port
102.2 Second nozzle liquid port
102.3 Third nozzle liquid port
102.4 Fourth nozzle liquid port
104 Nozzle compressed-air port
104.1 First nozzle compressed-air port
104.2 Second nozzle compressed-air port
104.3 Third nozzle compressed-air port
104.4 Fourth nozzle compressed-air port
200 Sensor cleaning module
220 Pressure cylinder
220.1 First pressure cylinder
220.2 Second pressure cylinder
220.3 Third pressure cylinder
220.4 Fourth pressure cylinder
221 Cylinder inner wall of the pressure cylinder
222 Air chamber
223 Air chamber port
224 Liquid chamber
225 Liquid chamber port
225.1 First liquid chamber port
225.2 Second liquid chamber port
225.3 Third liquid chamber port
225.4 Fourth liquid chamber port
225.1A First part of the first liquid chamber port
225.1B Second part of the first liquid chamber port
226 Separating means
227 Cylinder plunger
228 Restoring spring
229 Sealing ring
230 Air chamber line
270 Switching valve
272 Module compressed-air port
273 Compressed-air connection line
278 Compressed-air nozzle line
290 Module housing
292 Valve cartridge housing
300 Sensor surface
300.1 First sensor surface
300.2 Second sensor surface
301 Sensor
301.1 First sensor
301.2 Second sensor
305 Sensor signal
306 Sensor line
307 Sensor line
320 Cleaning nozzle
320.1 First cleaning nozzle
320.2 Second cleaning nozzle
320.3 Third cleaning nozzle
320.4 Fourth cleaning nozzle
341 Compressed-air buffer
350 Induction pressure check valve
352 Liquid pulse check valve
354 Compressed-air pulse check valve
356 Bypass check valve
356.1 First bypass check valve
356.2 Second bypass check valve
356.3 Third bypass check valve
356.4 Fourth bypass check valve
400 Liquid source
520 Nozzle branch
520.1 First nozzle branch
520.2 Second nozzle branch
520.3 Third nozzle branch
520.4 Fourth nozzle branch
530 Pressure cylinder block
532 Pressure cylinder module
532.1 First pressure cylinder module
532.2 Second pressure cylinder module
532.3 Third pressure cylinder module
532.4 Fourth pressure cylinder module
534 Module side
536 Inner wall
560 Liquid distributor
570 Compressed-air distributor
580 Compressed-air bypass distributor
590 Module control connection
592 Control connection
592.1 First bypass control connection
592.2 Second bypass control connection
592.3 Third bypass control connection
592.4 Fourth bypass control connection
594 Switching valve control connection
594.1 First switching valve control connection
594.2 Second switching valve control connection
594.3 Third switching valve control connection
594.4 Fourth switching valve control connection
600 Compressed-air source
602 Compressor
604 Pressure accumulator
606 Compressed-air supply system
618 Module liquid port
619 Cylinder connection point
619.1 First cylinder connection point
619.2 Second cylinder connection point
619.3 Third cylinder connection point
619.4 Fourth cylinder connection point
621 Bypass connection point
621.1 First bypass connection point
621.2 Second bypass connection point
621.3 Third bypass connection point
621.4 Fourth bypass connection point
623 Bypass line
623.1 First bypass line
623.2 Second bypass line
623.3 Third bypass line
623.4 Fourth bypass line
626 Liquid nozzle line
626.1 First liquid nozzle line
626.2 Second liquid nozzle line
626.3 Third liquid nozzle line
626.4 Fourth liquid nozzle line
1000 Vehicle
1002 Passenger motor vehicle
1004 Utility vehicle
1020 Vehicle control unit
1022 Control signal
1024 Vehicle control line
1026 Vehicle bus
2700 Switching valve
2701 First switching valve
2702 Second switching valve
2703 Third switching valve
2704 Fourth switching valve
2700A Air admission position
2700B Venting position
2700.1 First port of the switching valve
2700.2 Second port of the switching valve 2700.3 Third port of the switching valve
2701.1 First port of the first switching valve
2702.1 First port of the second switching valve
2703.1 First port of the third switching valve
2704.1 First port of the fourth switching valve
3300 Bypass valve
3301 First bypass valve
3302 Second bypass valve
3303 Third bypass valve
3304 Fourth bypass valve
3320 2/2 directional valve
3320A Closed position of the 2/2 directional valve
3320B Open position of the 2/2 directional valve
3320.1 First port of the 2/2 directional valve
3320.2 Second port of the 2/2 directional valve
3320.3 Control line of the 2/2 directional valve
3330 2/2 directional solenoid valve
3340 3/2 directional valve
3340.1 First port of the 3/2 directional valve
3340.2 Second port of the 3/2 directional valve
3340.3 Exhaust port of the 3/2 directional valve
3340A Closed position of the 3/2 directional valve
3340B Open position of the 3/2 directional valve
3400 Quick exhaust valve
3400.1 First port of the quick exhaust valve
3400.2 Second port of the quick exhaust valve
3400.3 Third port of the quick exhaust valve
3400.4 Valve element
3400.5 Quick exhaust valve control line
3401 First quick exhaust valve
3402 Second quick exhaust valve
3403 Third quick exhaust valve
3404 Fourth quick exhaust valve
AH Stroke amplitude
AS Plunger surface
AZ Cylinder axis
BDS Bypass compressed-air flow
BDS1 First bypass compressed-air flow
BDS2 Second bypass compressed-air flow
BDS3 Third bypass compressed-air flow
BDS4 Fourth bypass compressed-air flow
BDRI Bypass compressed-air cleaning pulse
BDRI1 First bypass compressed-air cleaning pulse
BDRI2 Second bypass compressed-air cleaning pulse
BDRI3 Third bypass compressed-air cleaning pulse
BDRI4 Fourth bypass compressed-air cleaning pulse
DL Compressed air
DRI Compressed-air cleaning pulse
DRI1 First compressed-air cleaning pulse
DRI2 Second compressed-air cleaning pulse
DRI3 Third compressed-air cleaning pulse
DRI4 Fourth compressed-air cleaning pulse
F Cleaning liquid
FB Application force
FR Restoring force
FRI Liquid cleaning pulse
FRI1 First liquid cleaning pulse
FRI2 Second liquid cleaning pulse
FRI3 Third liquid cleaning pulse
FRI4 Fourth liquid cleaning pulse
HS Plunger height
HFMIN Minimum spring height
HFMAX Maximum spring height
PB Application pressure
PI Pulse pressure
PF Liquid pressure
PST Control pressure
UT Bottom dead center
OT Top dead center
VE Effective delivery volume
VF Liquid chamber volume
VL Air chamber volume
VS Plunger volume
VZ Cylinder volume
VZH Cylinder volume height

The invention claimed is:

1. A multi-channel cleaning apparatus for a vehicle for providing at least one of the following:
   i) a liquid cleaning pulse; and,
   ii) a compressed-air cleaning pulse;
   for at least first and second cleaning nozzles, the multi-channel cleaning apparatus comprising:
   said first and second cleaning nozzles;
   a module compressed-air port for admitting compressed air;
   a module liquid port for admitting cleaning liquid;
   at least first and second nozzle branches;
   said first nozzle branch being configured to provide a supply to at least one of said first and second cleaning nozzles independently of said second nozzle branch;
   each of said first and second nozzle branches including:
   a pressure cylinder defining a cylinder volume;
   a movable restoring-forced biased separator partitioning said cylinder volume fluid-tightly into an air chamber for accommodating said compressed air and a liquid chamber for accommodating said cleaning liquid;
   said air chamber having an air chamber port to which said compressed air can be applied to fill said air chamber;
   said movable restoring-forced biased separator being configured to move counter to a restoring force in response to a filling of said air chamber causing an enlargement of said air chamber resulting in a reduction in size of said liquid chamber whereby said cleaning liquid is provided in the form of the liquid cleaning pulse at a liquid nozzle line via a liquid chamber port of said liquid chamber;
   a switching valve defining an air admission position and being configured to provide a pneumatic connection between said module compressed-air port and said air chamber port when in said air admission position; and,
   a bypass valve configured to provide a pneumatic connection between said module compressed-air port and a compressed-air nozzle line bypassing said switching valve, in an open position of said bypass valve, to provide a bypass compressed-air flow.

2. The multi-channel cleaning apparatus of claim 1, wherein:
   said pressure cylinder defines a cylinder axis and has a cylinder inner wall;
   said separator is a cylinder plunger moveable axially along said cylinder axis and bearing sealingly against said cylinder inner wall of said pressure cylinder; and,
   said cylinder plunger has a cylindrical form and has a plunger height and is held in said pressure cylinder via a restoring spring having a spring constant for generating said restoring force.

3. The multi-channel cleaning apparatus of claim 2, further comprising a plurality of pressure cylinders and one pressure cylinder block accommodating said plurality of pressure cylinders therein.

4. The multi-channel cleaning apparatus of claim 3, wherein said plurality of pressure cylinders are arranged in said cylinder block as pressure cylinder modules all being the same.

5. The multi-channel cleaning apparatus of claim 3, wherein a cylinder plunger of the pressure cylinder of one nozzle branch has a plunger height different from a plunger height of a cylinder plunger of the pressure cylinder of another nozzle branch.

6. The multi-channel cleaning apparatus of claim 1, wherein said bypass valve is configured as a 2/2 directional valve.

7. The multi-channel cleaning apparatus of claim 6, wherein said 2/2 directional valve is at least one of the following: i) 2/2 directional solenoid valve and ii) cartridge valve.

8. The multi-channel cleaning apparatus of claim 1, wherein said bypass valve is configured as a normally-open 3/2 directional valve; and,
said 3/2 directional valve is configured to provide a pneumatic connection between said module compressed-air port and said compressed-air nozzle line in an open position and to provide a pneumatic connection between said compressed-air nozzle line and an exhaust port of said 3/2 directional valve in a closed position.

9. The multi-channel cleaning apparatus of claim 8, wherein:
said bypass valve is configured as an arrangement including said normally-open 3/2 directional valve and a quick exhaust valve;
said 3/2 directional valve is configured to provide a pneumatic connection between said module compressed-air port and said quick exhaust valve in an open position and to provide a pneumatic connection between said quick exhaust valve and an exhaust port of said 3/2 directional valve in a closed position; and,
said quick exhaust valve is between said bypass valve and one of the following:
i) said compressed-air nozzle line; and,
ii) in a compressed-air nozzle connection line pneumatically connecting said cleaning nozzle to said compressed-air nozzle line; and,
said quick exhaust valve is configured to admit said bypass compressed air flow and to provide a bypass compressed-air cleaning pulse.

10. The multi-channel cleaning apparatus of claim 1, wherein:
said bypass valve is configured as a normally-closed 3/2 directional valve; and,
said 3/2 directional valve is configured to provide a pneumatic connection between said module compressed-air port and said compressed-air nozzle line in an open position and to provide a pneumatic connection between a quick exhaust valve and an exhaust port of said 3/2 directional valve in a closed position.

11. The multi-channel cleaning apparatus of claim 3, wherein at least two of said pressure cylinders are assigned to one of said nozzle branches so as to cause said air chamber ports of said at least two pressure cylinders to be pneumatically connected to a single switching valve.

12. The multi-channel cleaning apparatus of claim 1, further comprising at least one of the following: i) four of said nozzle branches and ii) four of said pressure cylinders.

13. The multi-channel cleaning apparatus of claim 1, further comprising a module control connection.

14. The multi-channel cleaning apparatus of claim 13, further comprising a module control unit configured for communication between said multi-channel cleaning apparatus and said module control connection and a vehicle control unit of the vehicle.

15. The multi-channel cleaning apparatus of claim 14, wherein said communication is between the module control connection of said multi-channel cleaning apparatus and said vehicle control unit via a vehicle bus.

16. A multi-channel sensor cleaning module comprising:
a module housing; and,
a multi-channel cleaning apparatus for a vehicle for providing at least one of the following:
i) a liquid cleaning pulse; and,
ii) a compressed-air cleaning pulse;
for at least first and second cleaning nozzles, the multi-channel cleaning apparatus including:
said first and second cleaning nozzles;
a module compressed-air port for admitting compressed air;
a module liquid port for admitting cleaning liquid;
at least first and second nozzle branches;
said first nozzle branch being configured to provide a supply to at least one of said first and second cleaning nozzles independently of said second nozzle branch;
each of said first and second nozzle branches including:
a pressure cylinder defining a cylinder volume;
a movable restoring-forced biased separator partitioning said cylinder volume fluid-tightly into an air chamber for accommodating said compressed air and a liquid chamber for accommodating said cleaning liquid;
said air chamber having an air chamber port to which said compressed air can be applied to fill said air chamber;
said movable restoring-forced biased separator being configured to move counter to a restoring force in response to a filling of said air chamber causing an enlargement of said air chamber resulting in a reduction in size of said liquid chamber whereby said cleaning liquid is provided in the form of the liquid cleaning pulse at a liquid nozzle line via a liquid chamber port of said liquid chamber;
a switching valve defining an air admission position and being configured to provide a pneumatic connection between said module compressed-air port and said air chamber port when in said air admission position; and,
a bypass valve configured to provide a pneumatic connection between said module compressed-air port and a compressed-air nozzle line bypassing said switching valve, in an open position of said bypass valve, to provide a bypass compressed-air flow.

17. The multi-channel sensor cleaning module of claim 16, wherein said module housing is a valve cartridge housing.

18. A vehicle comprising:
at least one of a multi-channel cleaning apparatus and a multi-channel sensor cleaning module, wherein said multi-channel sensor cleaning module includes a module housing and said multi-channel cleaning apparatus;
said multi-channel cleaning apparatus being configured to provide at least one of a liquid cleaning pulse and a compressed-air cleaning pulse for at least first and second cleaning nozzles;
said multi-channel cleaning apparatus including:
said first and second cleaning nozzles;
a module compressed-air port for admitting compressed air;
a module liquid port for admitting cleaning liquid;
at least first and second nozzle branches;
said first nozzle branch being configured to provide a supply to at least one of said first and second cleaning nozzles independently of said second nozzle branch;
each of said first and second nozzle branches including:

a pressure cylinder defining a cylinder volume;

a movable restoring-forced biased separator partitioning said cylinder volume fluid-tightly into an air chamber for accommodating said compressed air and a liquid chamber for accommodating said cleaning liquid;

said air chamber having an air chamber port to which said compressed air can be applied to fill said air chamber;

said movable restoring-forced biased separator being configured to move counter to a restoring force in response to a filling of said air chamber causing an enlargement of said air chamber resulting in a reduction in size of said liquid chamber whereby said cleaning liquid is provided in the form of the liquid cleaning pulse at a liquid nozzle line via a liquid chamber port of said liquid chamber;

a switching valve defining an air admission position and being configured to provide a pneumatic connection between said module compressed-air port and said air chamber port when in said air admission position; and, a bypass valve configured to provide a pneumatic connection between said module compressed-air port and a compressed-air nozzle line bypassing said switching valve, in an open position of said bypass valve, to provide a bypass compressed-air flow.

19. The vehicle of claim 18, wherein said vehicle is one of the following:

i) a passenger motor vehicle;
ii) a utility vehicle; and,
iii) a trailer.

* * * * *